United States Patent [19]

Hall

[11] 4,245,878
[45] Jan. 20, 1981

[54] ELECTRICAL WALLPLATE FITTINGS

[75] Inventor: Stephen Hall, London, England

[73] Assignee: Rotaflex (Great Britain) Limited, London, England

[21] Appl. No.: 36,137

[22] Filed: May 4, 1979

[30] Foreign Application Priority Data

May 10, 1978 [GB] United Kingdom ............... 18771/78

[51] Int. Cl.³ .......................................... H01R 13/625
[52] U.S. Cl. .................................. 339/88 R; 339/135; 339/188 R
[58] Field of Search .................. 339/88, 135, DIG. 2, 339/188-190

[56] References Cited

U.S. PATENT DOCUMENTS

| 2,766,434 | 10/1956 | Gear | 339/135 |
| 3,633,151 | 1/1972 | Sensabaugh | 339/88 R |

FOREIGN PATENT DOCUMENTS

| 1558 of 1895 | United Kingdom | 339/189 R |
| 741903 12/1955 | United Kingdom | 339/188 |

Primary Examiner—John McQuade
Attorney, Agent, or Firm—Arthur B. Colvin

[57] ABSTRACT

An electrical wallplate fitting comprising a base part, a cover rotatable through a predetermined angle between initial and final positions relative to the base to secure the cover mechanically to the base part and to release the cover from the base part, a plurality of first electrical contacts mounted on the base part at different radial distances from the axis of rotation of the cover, and a corresponding number of second contacts so positioned on the cover that when the cover is rotated from the initial to the final position the second contacts move along respective arcuate paths into contact with respective first contacts.

3 Claims, 6 Drawing Figures

ELECTRICAL WALLPLATE FITTINGS

This invention is concerned with electrical fittings and in particular to connection boxes of the kind used on walls and ceilings (hereinafter referred to for convenience as "wallplates") for connecting a wall or ceiling mounted appliance to a main electricity supply circuit.

According to the invention there is provided an electrical wallplate fitting comprising a base part, a cover rotatable through a predetermined angle between initial and final positions relative to the base to secure the cover mechanically to the base part and to release the cover from the base part, a plurality of first electrical contacts mounted on the base part at different radial distances from the axis of rotation of the cover, and a corresponding number of second contacts so positioned on the cover that when the cover is rotated from the initial to the final position the second contacts move along respective arcuate paths into contact with respective first contacts.

When electrical wiring is being installed in a building it is common practice to leave cables protruding from walls where it is anticipated that wall mounted appliances, such as light fittings, might be required. Exposed protruding cables are both unsightly and potentially dangerous and can be avoided by using electrical wall plate fittings according to the invention. The fitting can safely be left unused until an appliance is to be powered from it when all that is required is to remove the cover, wire the appliance to the cover contacts and replace the cover on the base part of the fitting. The appliance may be conveniently supported by the cover itself.

In a preferred embodiment of the invention the base part and cover are provided with cam means which cooperate as the cover is turned towards the final position to bring the cover into close, secure contact with the base part. The cam means consists of several pairs of complementary cams unifomly spaced apart around the periphery of the base part and cover. Releasable locking means is also provided for locking the cover in its final position relative to the cover, the locking means taking the form of a latch projection on the cover which snaps into a recess in the base part. The cover itself flexes resiliently to provide the necessary spring action for the latch projection.

Preferably either the first or the second contacts comprises spring wiper blades so that a wiping action is obtained between the contacts as the cover is rotated to ensure good electrical connection. The angular displacement of the cover between the initial and final positions need by only small and in the preferred embodiment is of the order of 10°.

The presently preferred embodiment of the invention will now be described in detail by way of example with reference to the accompanying drawings in which.

Figure 1:
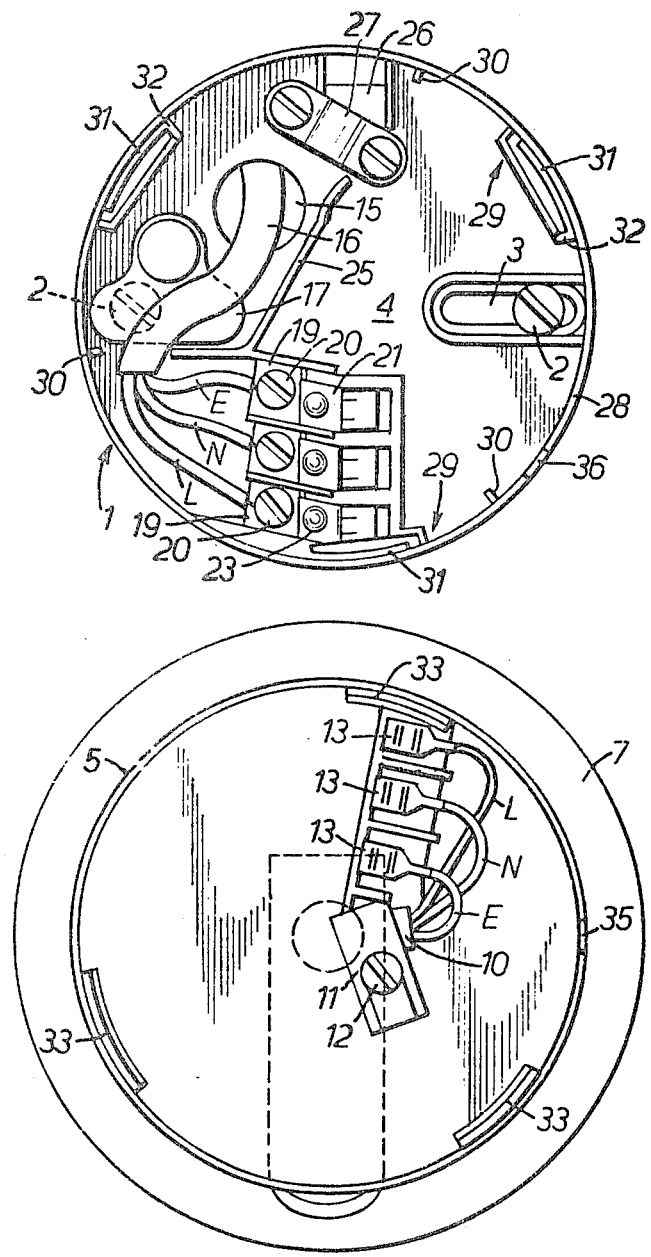
FIG. 1 is a plan view showing showing the base and cover of the wall plate.

The wall plate illustrated in the drawings includes two separable moulded plastic parts, namely a circular base 1 adapted to be firmly secured to a ceiling or wall by screws 2 which pass through slots 3 provided for that purpose in the bottom wall 4 of the base, and a cover plate 5. A bracket 6 carrying a spot light 7 is firmly secured on a central, hollow spigot 8 integral with the cover 5 by a clamping ring 9. An electric cable 10 extending from the spot light 7 passes through the spigot 8 to the inside surface of the cover where it is firmly gripped by a cable clamp 11 which is tightened by a screw 12. Spade connectors 13 are fitted to the ends of the conductors of the conventional live L, neutral N and earth E leads of the cable 10 and the connectors 13 are pushed on to respective lugs 14 formed of insulating plastics material integrally with the cover. The lugs 14 extend parallel to the plane of the cover and are spaced apart in a line substantially radial to the cover.

The bottom wall 4 of the base 1 has a cable entry hole 15 through which a supply cable 16 passes. To prevent the cable sheath chaffing against the head of the fixing screw 2 a plate 17 is positioned between them. The plate 17 can be pivoted away from the illustrated position to expose the screw for fixing purposes. The conductors of the live L, neutral N and earth E leads of the cable are stripped of insulation at their ends and are connected by screws 20 to terminal portions 19 of respective wiper blades 21. The screws 20 are in threaded engagement with cooperating nuts (not shown) embedded in thick portions 22 of the bottom wall 4. The wiper blades are fixed to the base by pins 23 and have end portions which are turned back upon themselves to form spring wiper contacts 24. As may be seen from FIG. 1, the wiper contacts are aligned radially of the base and are positioned for cooperation with the contacts formed by the spade connectors 13 on the cover. The base bottom wall 4 also includes upstanding partition walls 25 and an alternative cable entry hole 26 and cable clamp 27.

Figure 2:
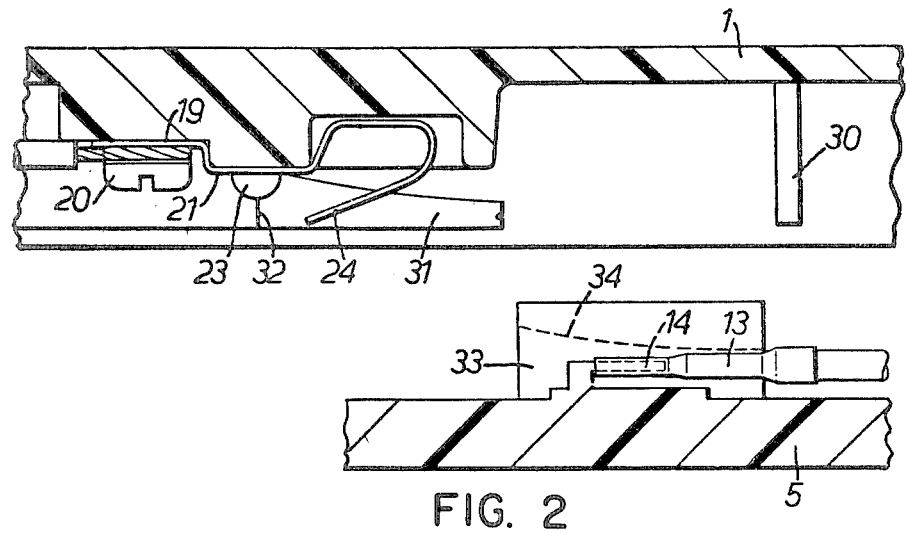
FIG. 2 is a broken section showing portions of the base and cover positioned ready to be brought together.
Figure 4:
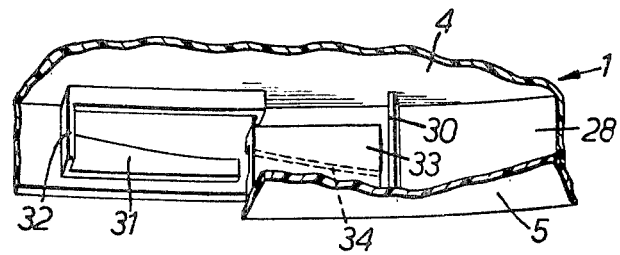
FIG. 4 is a cut-away perspective view illustrating cooperating cams on the cover and base.

Integral with the bottom wall 4 of the base 1 is a cylindrical side wall 28 on the inside of which three cover securing formations 29 are provided at 120° to each other. Each formation 29, seen most clearly in FIGS. 2 and 4, includes an upright rail 30, a circumferentially extending cam strip 31 having a slightly curved inner surface which is closer to the bottom wall at the rear end of the strip than it is at the front end which faces the rail 30, and a stop wall 32 at the rear end of the cam strip. The cover 5 is provided with three integral projections 33 spaced apart around the cover at 120° to each other for cooperation with the formations 29. The outer part of each projection 33 is shaped to define a curved camming shoulder 34 which faces the cover plate and curves away from it in the direction from a forward edge of the projection to a rear edge thereof.

Figure 5:
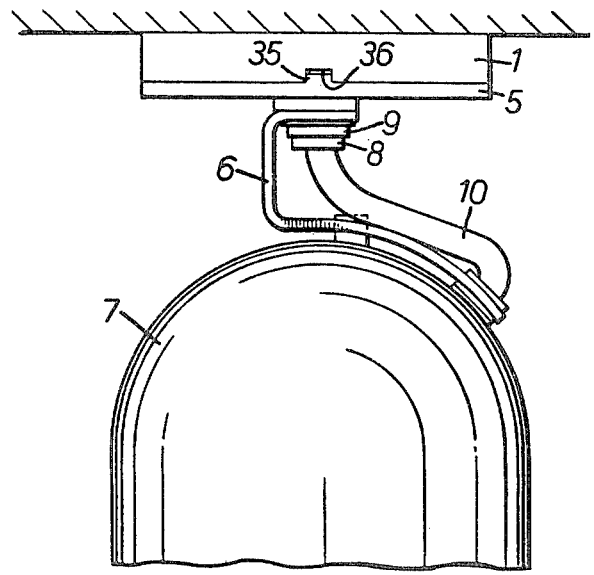
FIG. 5 is a side view of the wall plate shown mounted on a wall and carrying a lamp.

At its periphery the cover is additionaly formed with an upstanding, rectangular tooth 35 arranged for engagement in a complementary rectangular notch 36 provided in the side wall 28 of the base. (FIGS. 5 and 6).

In use of the wall plate, the base 1 is secured to a wall by screws 2 and the main supply cable is wired to the terminals 19 of the wiper blades 21. The spotlight 7 is attached to the cover 5 and wired thereto with the connectors 13 pushed on to lugs 14, as described above. The cover 5 is placed axially together with the base 1 so that the projection 33 which is generally aligned with the line of connectors 13 enters the opening defined between the rail 30 and the forward edge of the cam strip 31 of the securing formation 29 generally aligned radially with the wiper blades 21 (see FIG. 2). In other words, as seen in FIG. 1, the cover 5 is turned over on top of the base 1. The uniform spacing between the formations 29 and projections 33 ensures that the other two projections 33 will enter the corresponding openings defined by the other formations 29. The cable clamp 11 cooperates with the partition walls 25 in the base to prevent the cover and base being brought together in any other than the rotational alignment described.

Figure 3:
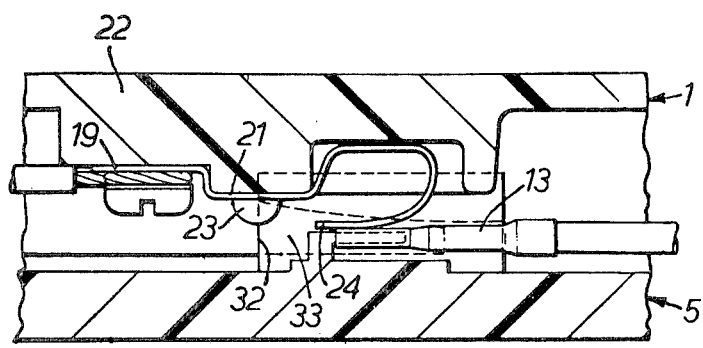
FIG. 3 is a similar view to FIG. 2, but showing the cover fitted to the base.

The cover 5 is then rotated with respect to the base 1 to bring the cam surfaces 34 on the projections 33 into engagement with those of the corresponding cam strips 31, the camming surfaces cooperating to pull the cover 5 towards the base as the rotation is continued until the leading edges of the projections 33 abut the stops 32, as shown in FIG. 3. If the cover is imagined placed on top of the base in FIG. 1, the direction of rotation of the cover is clockwise. The angle of rotation between the initial and final positions, as determined by the rails 30 and stops 32, is about 12°. During the relative rotation between the cover 5 and base 1 the wiper contacts 24 come into contact with and wipe over the connectors 13 and in this way a good electrical connection is obtained between the sets of contacts. It will be appreciated that as cover 5 is rotated the connectors 13 associated with the leads L, N. S of cable 10 will move along respective arcuate paths, each of which includes the corresponding wiper contact 24 associated with the lead L, N or E of the cable 16.

Figure 6:
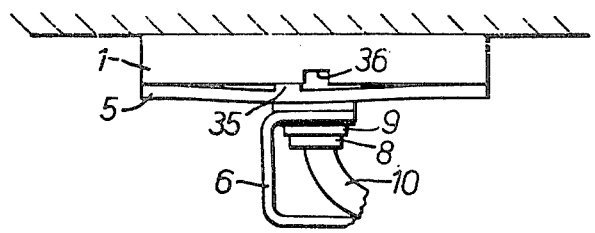
FIG. 6 is a similar view to FIG. 5 and showing the cover in a position just before full engagement with the base.

During the initial rotation of the cover the tooth 35 slides along the rim of the base sidewall 28 and the inherent resilience of the cover 5 allows it to flex away from the base, as shown in FIG. 6. As the projections 33 come into abutment with the stops 32 the tooth 35 registers with and snaps into the recess 36 in the side wall 28 (FIG. 5) to lock the cover 5 against reverse rotation and hence disengagement from the base 1. To remove the cover 5 from the base 1 a screwdriver tip or other suitable tool must be inserted between the tooth 35 and bottom of recess 36 to force the tooth out of the recess and the cover then turned to release it from the base.

While a wallplate having three pair of contacts has been described it will be appreciated that more or less pairs of contacts may be provided as required. For example, in certain types of electrical installations earth connections are unnecessary, so that the earth contacts can be omitted from the wallplate.

Having thus described my invention, what I claim as new and desire to secure by Letters Patent of the United States is:

1. An electrical wall plate fitting comprising a base part having a center axis, said base part having an axially outwardly projecting peripheral skirt portion terminating in a planar lip, a series of first electrical contacts mounted on said base part at varying distances from said center axis, each of said contacts including conductive finger portions shiftable in the direction of said center axis, a cover part of generally planar configuration, said cover part having a central axis and being formed of resilient material, said cover part having a side marginal edge portion congruent to said lip of said skirt, a series of second contacts formed on said cover part and spaced from the central axis thereof in accordance with the spacing of said first electrical contacts from the center axis of said base part, cam means on one said part and follower means on the other said part, said cam and follower means being adapted to shift said cover part toward said base part responsive to relative rotation of said parts in the engaged position of said cam and follower means, thereby to urge said contacts of said first and second series into mutual engagement, and complemental locking means formed on said edge portion of said cover part and said skirt portion of said base part, said locking means including a recess on one said part and a latch on the other said part, said latch, in the locked position of said locking means, being disposed within said recess, said latch being adapted to be cleared from said recess responsive to outward flexure of said cover part away from said base part in the direction of said central axis of said cover part.

2. Apparatus in accordance with claim 1 wherein said cover part includes a fixture externally mounted thereon, electrical cables extending from said contacts to said fixture through said cover part, cable clamp means disposed on the surface of said cover part nearest said base part, and guide means on said base part positioned to engage said cable clamp means to prevent engagement of said cam and follower means in all but a selected relatively rotated position of said base and cover parts.

3. Apparatus in accordance with claim 1 wherein said latch and recess include side wall portions aligned substantially parallel with the center axis of said base part.

* * * * *